United States Patent
Lee et al.

(10) Patent No.: US 12,191,799 B2
(45) Date of Patent: Jan. 7, 2025

(54) PHOTOVOLTAIC MODULE STOWING DURING DIFFUSE LIGHT CONDITIONS

(71) Applicant: Array Technologies, Inc., Albuquerque, NM (US)

(72) Inventors: Kyumin Lee, Albuquerque, NM (US); Kendra Passow, Albuquerque, NM (US); Daniel Fusaro, Albuquerque, NM (US); John Moseley, Albuquerque, NM (US); Sanket Shah, Pflugerville, TX (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/326,902

(22) Filed: May 31, 2023

(65) Prior Publication Data

US 2024/0186942 A1   Jun. 6, 2024

Related U.S. Application Data (60) Provisional application No. 63/365,598, filed on May 31, 2022.

(51) Int. Cl.
| | | |
|---|---|---|
| *H02S 20/32* | (2014.01) | |
| *G01S 3/786* | (2006.01) | |
| *F24S 20/00* | (2018.01) | |
| *F24S 40/00* | (2018.01) | |
| *F24S 50/00* | (2018.01) | |
| *F24S 50/20* | (2018.01) | |
| *G05D 3/00* | (2006.01) | |
| *G05D 3/10* | (2006.01) | |

(52) U.S. Cl.
CPC ............ *H02S 20/32* (2014.12); *G01S 3/7861* (2013.01); *F24S 2020/16* (2018.05); *F24S 40/00* (2018.05); *F24S 50/00* (2018.05); *F24S 50/20* (2018.05); *G05D 3/00* (2013.01); *G05D 3/105* (2013.01); *Y02E 10/47* (2013.01)

(58) Field of Classification Search
CPC ........ H02S 20/32; H02S 50/00; G01S 3/7861; F24S 40/00; F24S 50/00; F24S 50/20; F24S 2020/16; G05D 3/00; G05D 3/105; Y02E 10/47

See application file for complete search history.

(56) References Cited

U.S. PATENT DOCUMENTS

| | | | |
|---|---|---|---|
| 2018/0031418 A1* | 2/2018 | Freeman | G01J 1/0437 |
| 2021/0103303 A1 | 4/2021 | Sharp et al. | |
| 2021/0273602 A1* | 9/2021 | Gu | G05D 3/105 |

FOREIGN PATENT DOCUMENTS

EP          3940951 A1 *   1/2022   ............. F24S 30/42

OTHER PUBLICATIONS

International Search Report and Written Opinion mailed Sep. 22, 2023 in PCT Application No. PCT/US2023/024062, 10 pgs.

\* cited by examiner

*Primary Examiner* — Michael Y Sun
(74) *Attorney, Agent, or Firm* — MASCHOFF BRENNAN (57) ABSTRACT

Exemplary embodiments of the present disclosure address problems experienced in conventional tracking systems, including problems associated with inefficiencies created during diffuse light conditions. Embodiments disclosed herein address this problem by altering an angular orientation of PV modules during diffuse light conditions to ensure that the PV modules are in a position that more efficiently generates energy from diffuse irradiance.

20 Claims, 9 Drawing Sheets

PHOTOVOLTAIC MODULE STOWING DURING DIFFUSE LIGHT CONDITIONS

CROSS-REFERENCE TO RELATED APPLICATION

This application claims priority under 35 U.S.C. § 119 to U.S. Provisional Application No. 63/365,598, filed May 31, 2022, the entire disclosure of which is incorporated herein by reference.

TECHNICAL FIELD

The present disclosure generally relates to stowing of photovoltaic modules during diffuse light conditions.

BACKGROUND

Solar irradiance collected by photovoltaic (PV) modules may be converted into energy via the photovoltaic effect, which is the generation of voltage and electric current in a material upon exposure to light. PV modules may be monofacial modules that collect light through the front face only, or bifacial modules that collect light through both the front and back faces. The amount of energy generated by a PV module is to the first order proportional to the solar energy that falls on the active surfaces of the PV module, or the "incident irradiance." Incident irradiance includes direct (or beam) irradiance, sky diffuse irradiance, and reflected irradiance.

Direct irradiance includes direct rays of sunlight that are angled towards a surface of the PV module. Direct irradiance also includes circumsolar diffuse radiation, which is diffuse irradiance that originates from the vicinity of the Sun as seen by an observer on the ground. Sky diffuse irradiance may include scattered light originating from areas of the sky that are not within the vicinity of the Sun. Reflected irradiance is generated by direct and diffuse irradiance and may include light reflected by the ground or neighboring PV modules that is incidentally captured by the PV module.

PV modules in solar panel systems are often mounted on a support structure that allows the angle of the PV modules to change throughout the day to maximize the amount of direct irradiance received from the Sun. Systems that allow the angle of the PV modules with respect to the support structure to change, or "solar tracking systems," enable the PV modules to track a position of the Sun throughout the day to maximize the amount of direct irradiance that is received from the Sun.

While rotating a torque tube to change an angle of one or more PV modules to track the Sun position is often the best strategy to maximize the power generation of PV modules, this is not always the case. Indeed, during certain conditions, more power may be generated by angling the PV modules away from the Sun position. For example, during "diffuse light conditions," or conditions in which there are clouds, haze, mist, fog or other environmental conditions that partially or wholly obscure or block direct irradiance from the Sun, more energy may be generated from diffuse irradiance. An angle at which a PV module maximizes diffuse irradiance collection may not be the same angle at which the PV module maximizes direct irradiance collection. Thus, optimized performance for solar tracking systems may be achieved by modifying the position of PV modules during diffuse light conditions.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Exemplary embodiments of the present disclosure address conditions under which tracking angles calculated using conventional tracking algorithms do not maximize incident irradiance, specifically during diffuse light conditions. Embodiments disclosed herein address this problem by altering an angular orientation of PV modules during diffuse light conditions to ensure that the PV modules are in a position that more effectively generates energy from diffuse irradiance. To do this, it is important to obtain accurate data regarding current environmental conditions at a location of the tracking system. In some embodiments, this data may be gathered by a sensor that is on-site at the location of the tracking system. Using this data, incident irradiance levels for PV modules at different angular orientations may be determined. If thresholds, including thresholds for irradiance gains, are met or exceeded, the PV modules may be placed into diffuse-stow positions.

Placing PV modules into diffuse-stow positions consumes energy and increases wear on components; there is also risk in the form of lost energy production associated with placing tracking systems in diffuse stow when generic tracking is more advantageous. Thus, additional factors may be evaluated to ensure that PV modules should be placed into diffuse-stow positions and reduce the risk of false positives. For example, in some embodiments an irradiance gain threshold may be required to be consistently met for some period of time before PV modules are placed into diffuse-stow positions. In some embodiments, a GHI variability over a certain period of time may be required to be below a variability threshold before PV modules are placed into diffuse-stow positions. In some embodiments, a certain amount of time may be required to have passed since the previous movement into or out of diffuse-stow positions. In other embodiments, PV modules may be prevented from moving into diffuse-stow positions if the number of times that they have been moved into the diffuse-stow positions in a current period from sunrise to sunset exceeds some threshold. In other embodiments, PV modules may be prevented from moving into diffuse-stow positions if a normal tracking position of the PV modules is within a proximity threshold to another tracking event. In other embodiments, the placing of the PV module into the diffuse-stow position may also be based on a determination that the normal tracking position is not the same as or is greater in magnitude than the diffuse-stow position.

In addition to moving PV modules into diffuse-stow positions, the present disclosure also provides methods and systems for determining whether to take PV modules out of diffuse-stow positions. Factors similar to those evaluated when placing PV modules into diffuse-stow positions may be used to determine whether to take PV modules out of diffuse-stow positions.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

PV modules in solar tracking systems rotate throughout the day using tracking angles that are pre-determined according to the solar position to maximize the direct irradiance on the PV modules. For example, when the Sun is directly overhead, the normal tracking position may include a horizontal configuration for the PV modules. Normal tracking positions may include angles between approximately +52 degrees from horizontal and −52 degrees from horizontal, although other limits are possible.

On clear days, tracking angles that orient the PV modules toward the Sun may maximize incident irradiance. However, depending on environmental conditions, directing PV modules toward the Sun may not maximize incident irradiance. For example, during "diffuse light conditions," or conditions in which there are clouds, haze, mist, fog or other environmental conditions that partially or wholly obscure or block direct irradiance from the Sun, more energy may be generated from diffuse irradiance. Thus, increased energy production of solar tracking systems may be achieved by modifying the position of PV modules during diffuse light conditions.

For example, when the sky is overcast, the direct irradiance incident on the PV modules may decrease significantly because both the direct beams of sunlight and the circumsolar diffuse radiation may be obscured by clouds. To increase the amount of sunlight incident on the PV modules when the sky is overcast, the PV modules may be positioned in a diffuse-stow position, or an angular orientation that is closer to a horizontal configuration, so that the active surfaces of the PV modules have a greater view of the sky dome, and a greater proportion of the sky diffuse irradiance may be captured. However, positioning the PV modules in a diffuse-stow position when the sky is not overcast may significantly reduce the amount of sunlight captured through direct irradiance and circumsolar diffuse radiation. Consequently, false positive decisions to place the PV modules into diffuse-stow positions may adversely affect energy generation by the PV modules at a solar site.

To determine whether to move PV modules in a solar tracking system from normal tracking angles to a diffuse-stow position, global horizontal irradiance (GHI) at the location of the solar tracking system may be determined at a specified time. GHI is the total solar radiation incident on a horizontal surface and may include a summation of direct irradiance, sky diffuse irradiance, and reflected irradiance. GHI may be determined from data gathered by on-site sensors, satellite images, forecasting services, or other sources of data.

Once GHI for the location of the solar tracking system has been determined, it may be used to determine a first plane-of-array (POA) irradiance for the PV modules at their normal tracking positions at the specified time. POA irradiance may be used to quantify the incident irradiance on a PV module at a given angular orientation. A second POA irradiance for the PV modules at diffuse-stow positions at the specified time may also be determined. The first POA irradiance and second POA irradiance may then be compared to identify whether an irradiance gain exists at the diffuse-stow position. In one embodiment, the first POA irradiance may be subtracted from the second POA irradiance. If a gain exists, the PV modules may be placed into the diffuse-stow positions.

Additional criteria may factor into the decision to move the PV modules into a diffuse-stow position to reduce the risk of false positives as well as to limit the power consumption by the solar tracking system and the wear on its components. For example, thresholds may be implemented to ensure that placing PV modules into diffuse-stow positions is justified. In one embodiment, a threshold irradiance gain must be met or exceeded before moving a PV module into a diffuse-stow position. In some embodiments, this threshold irradiance gain may be required to be consistently met for a certain period of time. In another embodiment, a GHI variability over a certain period of time may be required to be below a variability threshold before PV modules are placed into diffuse-stow positions. In another embodiment, a threshold length of time elapsed since the PV module last entered or exited the diffuse-stow position must be met or exceeded before moving a PV module out of or into a diffuse-stow position again. In another embodiment, a threshold number of times that the PV module has entered the diffuse-stow tracking position in a current period from sunrise to sunset must not be exceeded in order to move a PV module into a diffuse-stow position. In other embodiments, PV modules may be prevented from moving into diffuse-stow positions if a normal tracking position of the PV modules is within a proximity threshold to another tracking event. In another embodiment, the placing of the PV module into the diffuse-stow position may also be based on a determination that the normal tracking position is not the same as or is greater in magnitude than the diffuse-stow position.

Similar steps may be taken to determine whether to deactivate diffuse-stow positions and resume normal tracking for solar trackers. Using a GHI measurement that describes a total amount of solar radiation incident on a horizontal surface, POA irradiances incident on the given PV module at normal tracking position and diffuse-stow position may be estimated. If the PV modules are in a diffuse-stow position, whether the solar trackers should resume normal tracking may be determined by testing whether the difference between the estimated POA irradiance at the diffuse-stow position and the estimated POA irradiance at the normal tracking position is below a predetermined threshold. The threshold for taking a PV module out of a diffuse-stow position may be the same or different from the threshold used to determine to place the PV module into the diffuse-stow position. Using separate thresholds for activating and deactivating diffuse-stow positions may prevent frequent mode changes, thereby allowing gains in energy production without significant or any impact on the solar tracker lifetime.

Embodiments of the present disclosure are explained with reference to the accompanying figures.

Figure 1:
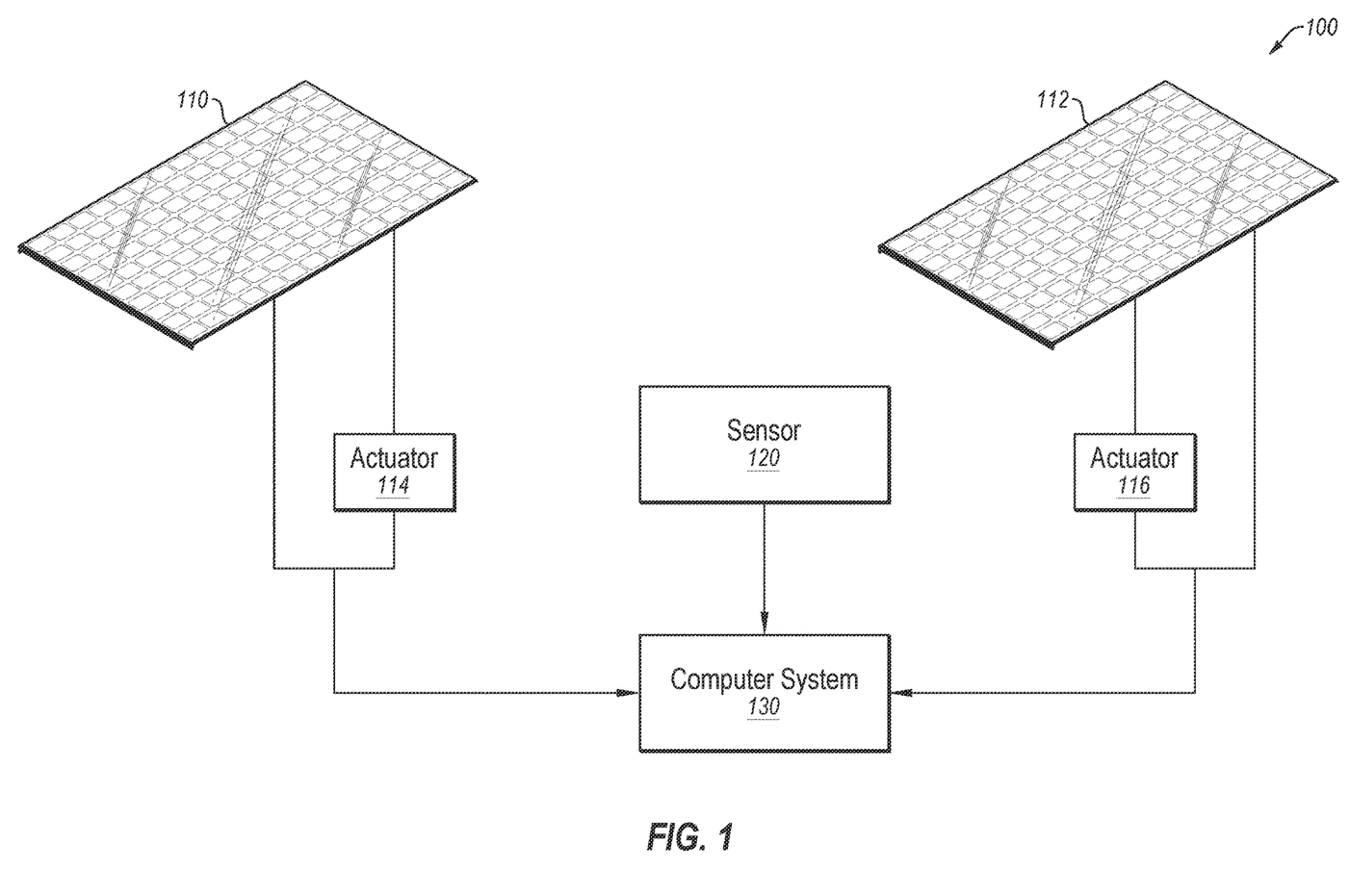
FIG. 1 illustrates an example system for stowing PV modules during diffuse light conditions.

FIG. 1 illustrates an example system 100 for stowing PV modules during diffuse light conditions. The system 100 includes a first PV module 110, a second PV module 112, actuators 114 and 116, a sensor 120, and a computer system 130. The actuators 114 and 116 may be configured to rotate the first and second PV modules 110 and 112, respectively, based on a position of the Sun over the course of a given day. Movement of the first and second PV modules 110 and 112 to track a position of the Sun over the course of a day may proceed according to a tracking algorithm that includes a plurality of different normal tracking positions. In some embodiments, the PV modules 110 and 112 may rotate between 50 degrees and 55 degrees from horizontal toward the East and between 50 degrees and 55 degrees from horizontal toward the West, although any angular orientation up to 90 degrees on either side of horizontal is possible.

The sensor 120 may be on-site, or proximate to the PV modules 110 and 112. The sensor 120 may collect data relating to the environment in which the system 100 is located. The sensor 120 may facilitate identification of various environmental conditions and changes. For example, the sensor 120 may include an irradiance sensor that absorbs solar radiation incident to the sensor 120 and determine an amount of solar energy captured for a given area at a specific time or over a given period of time at the location of the system 100. In one embodiment, the sensor 120 may be a pyranometer installed in a horizontal position to measure solar irradiance from a hemispherical field of view incident on a horizontal surface. The data collected by the sensor 120 may be used to determine a GHI at the location of the system 100.

As another example, the sensor 120 may include image-capturing sensors that are configured to capture images of a sky dome in the vicinity of the system 100 to facilitate identifying diffuse lighting conditions or any other environmental conditions that may affect the quantity of solar energy captured by the PV modules 110 and 112, such as rain or hail. As additional or alternative examples, the sensor 120 may include one or more weather sensors (e.g., barometers, anemometers, and rain gauges) or any other sensors that facilitate collecting information about environmental lighting conditions involving the system 100.

The information collected by the sensor 120 and information relating to operations of the first PV module 110 and the second PV module 112 may be obtained by the computer system 130. The computer system 130 may be configured to analyze this information and determine whether to place the first PV module 110 and/or the second PV module 112 into diffuse-stow positions. The diffuse-stow position may include a horizontal or approximately horizontal configuration of the first and second PV modules 110 and 112. For example, in some embodiments, a diffuse-stow position may be between 0 degrees and 20 degrees from horizontal toward the East and between 0 degrees and 20 degrees from horizontal toward the West, although larger or smaller angular orientations on either side of horizontal are possible. In one embodiment, the diffuse-stow position may be approximately +15 degrees from horizontal (or 15 degrees from horizontal toward the West) and −15 degrees from horizontal (or 15 degrees from horizontal toward the East). In this embodiment, the diffuse-stow position is not stationary but may track from +15 degrees to −15 degrees in a manner that is consistent with the normal tracking period of PV modules 110 and 112 such that there is no difference between a normal tracking position and a diffuse-stow position between 15 degrees and −15 degrees in the normal tracking period. In other embodiments, diffuse-stow positions may not track between but may be at set positions on either side of horizontal. For example, diffuse-stow positions may be either approximately +15 degrees from horizontal or −15 degrees from horizontal. In this embodiment, the side of horizontal may be determined based on the normal tracking position of the PV module. If the normal tracking position is a positive angle, the diffuse-stow position may be the positive angle from horizontal. On the other hand, if the normal tracking position is a negative angle, the diffuse-stow position may be the negative angle from horizontal.

Figure 4:
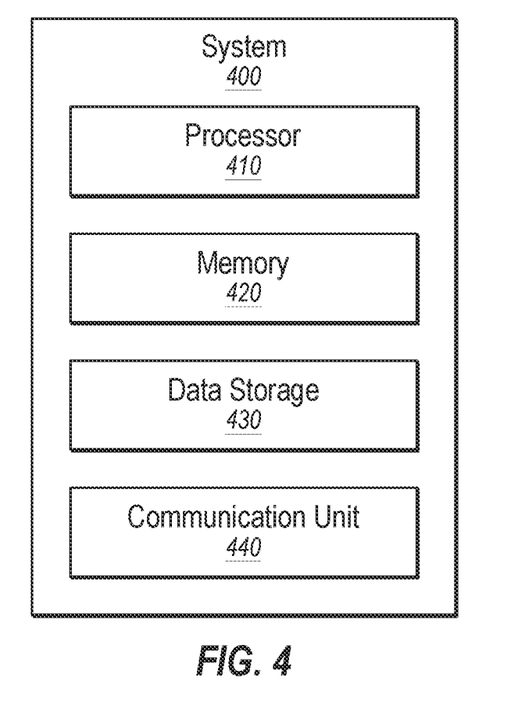
FIG. 4 is an example computing system that may be employed in stowing PV modules during diffuse light conditions.

In some embodiments, the computer system 130 may be any computer system capable of processing data and communicating instructions, examples of which are disclosed herein in connection with the computer system 400 of FIG. 4. PV modules 110 and 112 may be rotated by the actuators 114 and 116 into diffuse-stow positions, and out of diffuse-stow positions, based on commands received from the computer system 130. Commands to place the PV modules 110 and 112 into diffuse-stow positions may be provided in response to a determination, by the computer system 130, that conditions have been met for placing the PV modules 110 and 112 into diffuse-stow positions. Similarly, commands to remove the PV modules 110 and 112 from diffuse-stow positions may be provided in response to a determination, by the computer system 130, that conditions have been met for taking the PV modules out of the diffuse-stow positions and returning the PV modules 110 and 112 back to normal tracking positions.

Specifically, the computer system 130 may receive data from the sensor 120 and determine, based on this data, a GHI for the location of the PV modules 110 and 112 at a specified time. The computer system 130 may then determine, based on the GHI, a POA irradiance for the PV modules 110 and 112 at their normal tracking positions at the specified time and a POA irradiance for the PV modules 110 and 112 at the diffuse-stow positions at the specified time.

To determine the POA irradiance for the PV modules 110 and 112 at their normal tracking positions, the computer system 130 may decompose the GHI into direct and diffuse components and transpose the direct and diffuse components for a first plane parallel to the PV module at the normal tracking position. Similarly, to determine the POA irradiance for the PV modules 110 and 112 at the diffuse-stow positions, the computer system 130 may decompose the GHI into direct and diffuse components and transpose the direct and diffuse components for a first plane parallel to the PV module at the diffuse-stow position. Alternatively, the computer system 130 may assume that the POA irradiance for the PV modules 110 and 112 is the same as the GHI to determine the POA irradiance for the PV modules 110 and 112 at the diffuse stow positions.

Once the computer system 130 has determined a POA irradiance for the PV modules 110 and 112 at their normal tracking positions and a POA irradiance for the PV modules 110 and 112 at the diffuse-stow positions, it may compare these values to determine whether an irradiance gain exists at the diffuse-stow positions. If the PV modules 110 and 112 are in a normal tracking position and an irradiance gain exists at the diffuse-stow position, the computer system 130 may evaluate a number of different factors to decide whether to place the PV modules into the diffuse-stow position. Similarly, if the PV modules 110 and 112 are in a diffuse-stow position and an irradiance gain exists at the normal tracking position, the computer system 130 may evaluate a number of different factors to decide whether to place the PV modules into the normal tracking position.

In one embodiment, the computer system 130 may not place the PV modules 110 and 112 into the diffuse-stow position unless the irradiance gain at the diffuse-stow position meets or exceeds a gain threshold. In some embodiments this gain threshold may be at least 5 Watts per meter squared ($W/m^2$). In other embodiments, the gain threshold may be more or less than 5 $W/m^2$. For example, some embodiments may require an irradiance gain at the diffuse-stow position of 20 $W/m^2$ or more. In some embodiments, this threshold irradiance gain must be consistently met for a certain period of time, such as 1 hour. In one embodiment, the threshold gain must be consistently met for approximately 20 minutes. In other embodiments, the period of time that the irradiance gain must be consistently met may be more than 1 hour.

Similarly, the computer system 130 may not remove the PV modules 110 and 112 from the diffuse-stow position unless the irradiance gain at the normal tracking position meets or exceeds a gain threshold. In some embodiments this gain threshold may be at least −5 $W/m^2$. In other embodiments, the gain threshold may be more or less than −5 $W/m^2$. For example, some embodiments may require an irradiance gain at the normal tracking position of −20 $W/m^2$ or less. In some embodiments, this threshold irradiance gain must be consistently met for a certain period of time, such as 1 hour. In one embodiment, the threshold gain must be consistently met for approximately 20 minutes. In other embodiments, the period of time that the irradiance gain must be consistently met may be more than 1 hour. Irradiance gains may but need not be the same for placing PV modules into the diffuse-stow position and taking PV modules out of the diffuse stow position. For example, in one embodiment, a gain threshold of 5 $W/m^2$ may be required to place a PV module into a diffuse-stow position and a gain threshold of −10 $W/m^2$ may be required to remove a PV module from a diffuse-stow position.

In another embodiment, the computer system 130 may not place the PV modules 110 and 112 into the diffuse-stow position unless a GHI variability over a certain period of time is below a variability threshold. To identify a GHI variability, the computer system 130 may determine the difference between a maximum GHI and a minimum GHI over the period of time. If this difference is above a threshold, the computer system 130 may not place the PV modules 110 and 112 into the diffuse-stow position. In one embodiment, the variability threshold may be 500 $W/m^2$ or less over a time period of less than 1 hour. For example, the computer system 130 may not place the PV modules 110 and 112 into the diffuse-stow position if the variability threshold in GHI is more than approximately 150 $W/m^2$ over a time period of approximately 30 minutes. In other embodiments, the variability threshold may be more or less than 150 $W/m^2$ and the period of time may be more or less than 1 hour. A similar analysis may be undertaken to determine whether to take PV modules out of a diffuse-stow position.

In another embodiment, the computer system 130 may not place the PV modules 110 and 112 into or out of the diffuse-stow position unless a threshold amount of time has elapsed since the PV modules 110 and 112 last entered or exited the diffuse-stow position. In some embodiments, this threshold amount of time may be less than 1 hour. For example, the computer system 130 may not place the PV modules 110 and 112 into or out of the diffuse-stow position unless approximately 20 minutes has elapsed since the PV modules 110 and 112 last entered or exited the diffuse-stow position. In other embodiments, this threshold amount of time may be more than 1 hour. A similar analysis may be undertaken to determine whether to take PV modules out of a diffuse-stow position.

In another embodiment, the computer system 130 may not place the PV modules 110 and 112 into the diffuse-stow position if the PV modules 110 and 112 have met or exceeded an occurrence threshold over a specified period of time or during a current period from sunrise to sunset. This occurrence threshold may include a number of times that the PV modules 110 and 112 have entered the diffuse-stow position over the specified time period or during the current period from sunrise to sunset. For example, the computer system 130 may not place the PV modules 110 and 112 into the diffuse-stow position if the PV modules 110 and 112 have already been placed into the diffuse-stow position 3 times during the current period from sunrise to sunset. Alternatively, the computer system 130 may not place the PV modules 110 and 112 into the diffuse-stow position if the PV modules 110 and 112 have already been placed into the diffuse-stow position 3 times in the current sunrise to sunset period. The occurrence threshold need not be 3 times but can be more or less than 3 and the time period can be more or less than 24 hours. A similar analysis may be undertaken to determine whether to take PV modules out of a diffuse-stow position.

In another embodiment, the computer system 130 may not place the PV modules 110 and 112 into the diffuse-stow position if the PV modules 110 and 112 are within a proximity threshold to another tracking event. These tracking events may include a scheduled maintenance time, a proximity to maximum angles of PV modules 110 and 112, or a beginning or an end of the tracking period of PV modules 110 and 112. In some embodiments, this proximity threshold may be 1 hour or less from another tracking event. In other embodiments, this proximity threshold may be more or less than 1 hour. For example, this proximity threshold may be approximately 20 minutes from another tracking event. A similar analysis may be undertaken to determine whether to take PV modules out of a diffuse-stow position.

In another embodiment, the computer system 130 may not place the PV modules 110 and 112 into the diffuse-stow position if the normal tracking position and the diffuse-stow position are the same for the PV modules 110 and 112, or if the normal tracking position is the same as or greater in magnitude than the diffuse-stow position. For example, as stated previously, the diffuse-stow position may rotate in a manner that is consistent with a portion of the normal tracking period of the PV modules 110 and 112 such that there is no difference between a normal tracking position and a diffuse-stow position during this portion of the normal tracking period. Thus, in some embodiments, the computer system 130 may not place the PV modules 110 and 112 into the diffuse-stow position during these overlapping portions of the normal tracking period. A similar analysis may be undertaken to determine whether to take PV modules out of a diffuse-stow position.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, a system may not include an on-site sensor. In this embodiment, data necessary to determine GHI for a location of a solar tracking system may be received from a weather forecasting station, supervisory control and data acquisition (SCADA) information from on-site or off-site controllers, and/or one or more satellite images. In one embodiment, this information may be received by the computer system 130 over a network, such as the Internet.

Figure 2A:
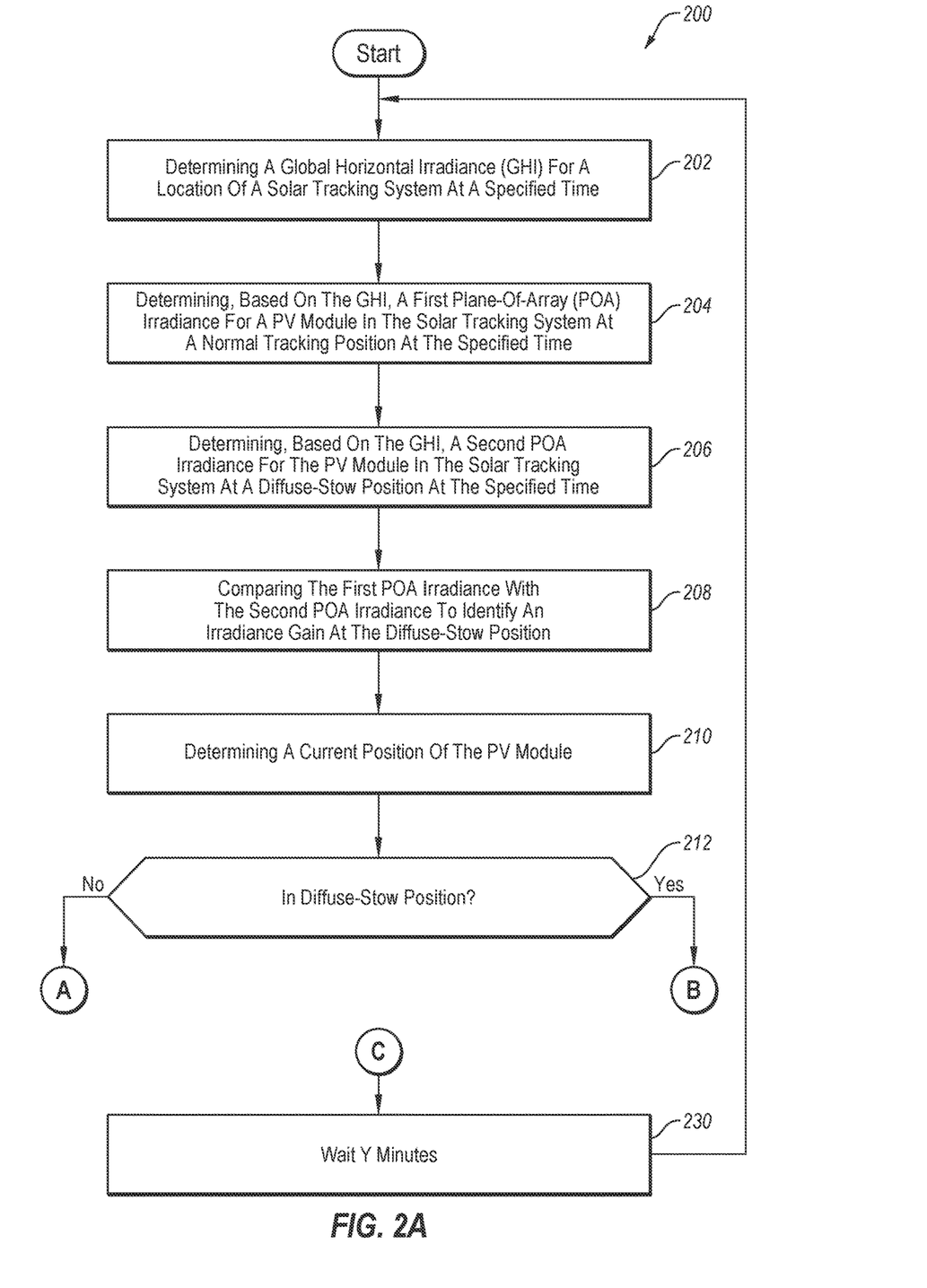
FIGS. 2A-2C illustrate a flowchart of an example method for stowing PV modules during diffuse light conditions.
Figure 2B:
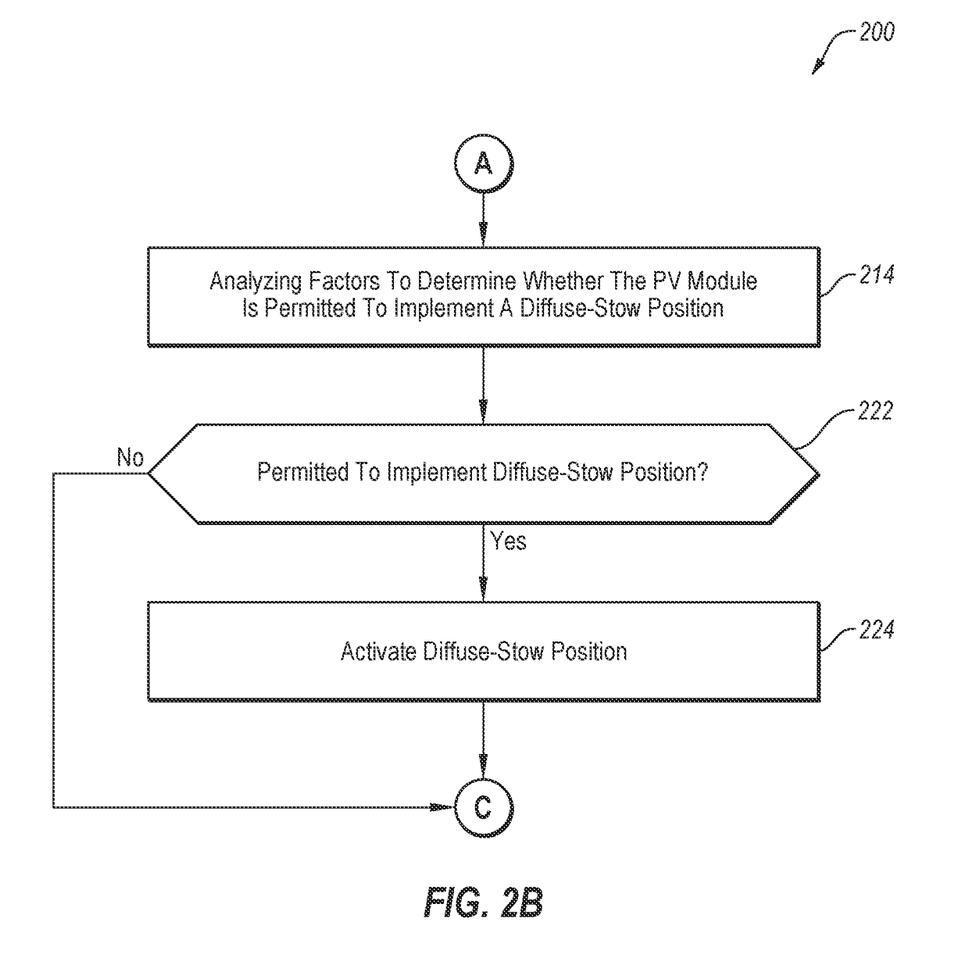
Figure 2C:
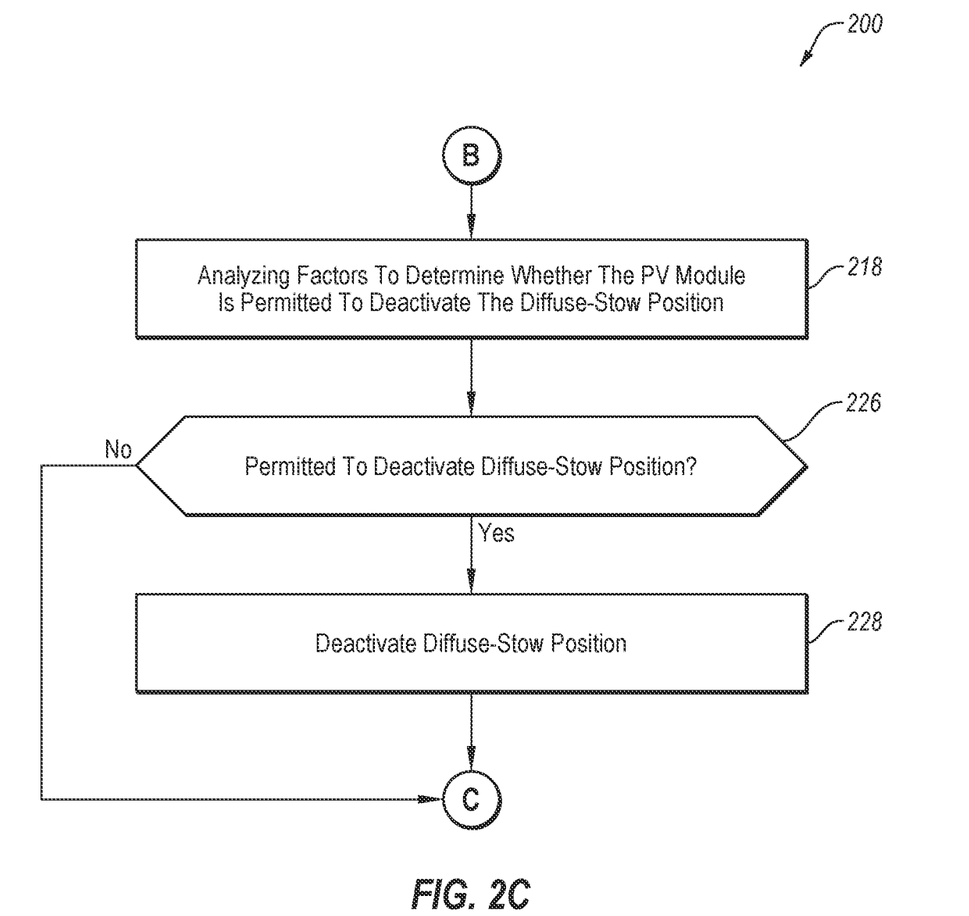

FIGS. 2A-2C illustrate flowcharts of an example method 200 for stowing PV modules during diffuse light conditions The method 200 may be performed by any suitable system, apparatus, or device. For example, a computer system associated with the PV modules, such as the computer system 130 in FIG. 1, may perform one or more operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may begin at block 202, where a global horizontal irradiance (GHI) for a location of a solar tracking system at a specified time is determined. In some embodiments, the GHI data may be measured using an irradiance sensor on a horizontal plane (i.e., having a tilt angle of 0 degrees) to determine a total irradiance obtained by the horizontal plane. Additionally, or alternatively, the GHI data may be estimated by analyzing one or more satellite images in combination with SCADA information collected at the solar site to estimate the GHI at the solar site.

At block 204, a first plane-of-array (POA) irradiance for a PV module in the solar tracking system at a normal tracking position at the specified time may be determined based on the GHI. In some embodiments, the normal tracking position of the PV module may be determined based on a solar position and a system geometry of the PV module (i.e., whether the particular PV module is tracking or backtracking). As will be appreciated by one of skill in the art, the POA irradiance at the normal tracking position may be determined using combined irradiance decomposition and transposition models of the GHI data for the PV module. Examples of such models and calculation methods are known in the art, one example of which is disclosed at Lave, Matthew, William Hayes, Andrew Pohl, and Clifford W. Hansen. "Evaluation of Global Horizontal Irradiance to Plane-of-Array Irradiance Models at Locations Across the United States." IEEE Journal of Photovoltaics 5.2 (2015): 597-606, the contents of which are incorporated herein by reference in its entirety. The POA irradiance may also be estimated by combining decomposition and transposition methods with view-factor calculation models, which may have advantages for estimating the direct irradiance, sky diffuse irradiance, and reflected irradiance components, especially for bifacial PV modules. Additionally, or alternatively, the GHI data may be used to directly estimate the current POA irradiance without using irradiance decomposition and transposition at shallower normal tracking positions, such as positions having angles between −20 degrees and 20 degrees.

At block 206, a second POA irradiance for the PV module in the solar tracking system at a diffuse-stow position at the specified time may be determined based on the GHI. In some embodiments, the same or a similar estimation as the estimation performed in relation to the POA irradiance at the normal tracking position at block 204 may be performed at the diffuse-stow position in which the diffuse-stow position may have a shallower angle than the angle of the normal tracking position, but not horizontal (i.e., not a tracking angle of 0 degrees).

At block 208, the first POA irradiance may be compared with the second POA irradiance to identify an irradiance gain at the diffuse-stow position. In some embodiments, calculating the POA irradiance gain may include computing a difference between the POA irradiance at the normal tracking position and the POA irradiance at the diffuse-stow position. For example, a positive POA irradiance gain (e.g., 2 W/m$^2$) may indicate that orienting the PV module at the diffuse-stow position may facilitate the PV module generating more energy than orienting the PV module at the normal tracking position. Alternatively, a negative POA irradiance gain (e.g., −5 W/m$^2$) may indicate that orienting the PV module at the normal tracking position may facilitate the PV module generating more energy than orienting the PV module at the diffuse-stow position.

At block 210, a current position of the PV module may be determined. In some embodiments, the current position of the PV module may be determined from information relating to the solar position or when the diffuse-stow position was last implemented or deactivated. The solar position may be estimated through astronomical calculations, using the site location and current time as inputs.

If the PV module was not previously in the diffuse-stow position, whether the PV module should implement the diffuse-stow position may be determined in blocks 214, 222, and 224.

In block 214, factors may be analyzed to determine whether the PV module is permitted to implement a diffuse-stow position. Implementing the diffuse-stow position shortly after deactivating it may lead to frequent changes in the tracker state, which may lead to significant increase in tracker travel and subsequent reduction in tracker lifetime. Consequently, in these and other embodiments, the PV module may be locked out of implementing the diffuse-stow position for a particular period of time after the last deactivation of the diffuse-stow position to prevent the angle of the PV module changing between the normal tracking position and the diffuse-stow position too frequently. For example, a cooldown period of 5 minutes, 10 minutes, 15 minutes, 20 minutes, 25 minutes, 30 minutes, 35 minutes, 40 minutes, 45 minutes, 50 minutes, 55 minutes, 1 hour, or any other cooldown period after the PV module deactivates the diffuse-stow position may be specified during which the PV module may not switch into the diffuse-stow position from the normal tracking position.

Another factor analyzed may include whether the normal tracking position has an angular configuration that is the same as or more horizontal than the diffuse-stow position, in which case implementing the diffuse-stow position is not expected to bring a benefit in the energy production. For example, if the Sun angle on the solar tracker's plane of motion is 8 degrees to East and the diffuse-stow position at that time is 15 degrees to East, then it is better for the control system to wait until the Sun angle becomes steeper than the designated diffuse-stow position in the afternoon, for example 15 degrees to West. Consequently, in these and other embodiments, the PV module may be locked out of implementing the diffuse-stow position if the Sun angle is shallower than the diffuse-stow positions designated for mornings and afternoons.

Another factor analyzed may include whether the irradiance gain at the diffuse-stow position meets or exceeds a gain threshold. Unless the estimated POA irradiance gain is greater than a pre-determined threshold for a pre-determined period, the solar tracker motion to the diffuse-stow position may not be justifiable. Consequently, in these and other embodiments, the estimated POA irradiance at the diffuse-stow position may be required to be larger than a predetermined threshold for a pre-determined period to justify the implementation of the diffuse-stow position. For example, the estimated POA irradiance gain may be required to be greater than 2 W/m$^2$ for 10 minutes continuously to recommend the implementation of the diffuse-stow position.

Another factor analyzed may include whether implementing the diffuse-stow position is likely to bring gains in the incident POA irradiance. To determine this, a GHI variability value, or a difference between maximum and minimum GHI values over a period of time may be identified. High variability in the recent GHI signal may indicate fast-moving clouds, in which case the implementation of the diffuse-stow position may lead to a decrease in the incident POA irradiance in case the clouds move away from the Sun and the direct irradiance increases. Consequently, in these and other embodiments, the variability of the GHI signal may be used to assess the risk of a false positive decision. For example, if the GHI signal during the last 15 minutes has a maximum-to-minimum spread greater than 150 W/m$^2$, this condition may indicate fast-moving clouds and consequently a risk of decrease in the incident POA irradiance if the diffuse-stow position is implemented. In these and other embodiments, the threshold values may be specified to decrease the frequency with which the PV module implements or deactivates the diffuse-stow position based on tracker wear considerations, a solar site operator's risk aversion to false positives, or any other reasons.

Another factor analyzed may include whether the PV modules 110 and 112 have met or exceeded an occurrence threshold over a specified period of time or in a current period from sunrise to sunset. This occurrence threshold may include a number of times that the PV modules 110 and 112 have entered the diffuse-stow position during the specified time period or in the current period from sunrise to sunset. For example, the computer system 130 may not place the PV modules 110 and 112 into the diffuse-stow position if the PV modules 110 and 112 have already been placed into the diffuse-stow position 3 times in the current period from sunrise to sunset. Alternatively, the computer system 130 may not place the PV modules 110 and 112 into the diffuse-stow position if the PV modules 110 and 112 have already been placed into the diffuse-stow position 3 times in the previous 24-hour period. The occurrence threshold need not be 3 times but can be more or less than 3 and the time period need not be 24 hours but can be more or less than 24 hours.

Another factor analyzed may include whether the PV modules 110 and 112 are within a proximity threshold to another tracking event. These tracking events may include a scheduled maintenance time, a proximity to maximum angles of PV modules 110 and 112, or a beginning or an end of the tracking period of PV modules 110 and 112. In some embodiments, this proximity threshold may be 1 hour or less from a scheduled maintenance time or the beginning or the end of the normal tracking period. In other embodiments, this proximity threshold may be more or less than 1 hour.

In blocks 222 and 224, the computer system may perform operations to implement the diffuse-stow position, if the results of the factors analyzed in block 214 indicate that the implementation of the diffuse-stow position is allowed and that doing so is likely to bring gains in the incident POA irradiance. In some embodiments, the diffuse-stow position may be implemented when all of the factors analyzed in block 214 recommends implementing the diffuse-stow position. In other embodiments, the diffuse-stow position may be implemented when one or more of the factors analyzed in block 214 recommends implementing the diffuse-stow position.

If the PV module was already in the diffuse-stow position, whether the PV module may deactivate the diffuse-stow position may be determined in blocks 218, 226, and 228.

In block 218, factors may be analyzed to determine whether the PV module is permitted to deactivate the diffuse-stow position. Deactivating the diffuse-stow position shortly after implementing it may lead to frequent changes in the tracker state, which may lead to significant increase in tracker travel and subsequent reduction in tracker lifetime. Consequently, in these and other embodiments, the PV module may be locked out of deactivating the diffuse-stow position for a particular period of time after the last implementation of the diffuse-stow position to prevent the angle of the PV module changing between the normal tracking position and the diffuse-stow position too frequently. For example, a cooldown period of 5 minutes, 10 minutes, 15 minutes, 20 minutes, 25 minutes, 30 minutes, 35 minutes, 40 minutes, 45 minutes, 50 minutes, 55 minutes, 1 hour, or any other cooldown period after the PV module implements the diffuse-stow position may be specified during which the PV module may not switch into the normal tracking position from the diffuse-stow position.

Another factor analyzed may include whether a normal tracking position has an angular configuration that is the same as or more horizontal than the diffuse-stow position, in which case deactivating the diffuse-stow position may be the logical choice to facilitate a smooth transition to the afternoon diffuse-stow position. For example, if the Sun angle on the solar tracker's plane of motion is 8 degrees to East and the designated diffuse-stow position at that time is 15 degrees to East, then it is better for the control system to wait until the Sun angle becomes steeper than the designated diffuse-stow position in the afternoon, for example 15 degrees to West, to reconsider the implementation of the diffuse-stow position. Consequently, in these and other embodiments, the PV module may deactivate the diffuse-stow position if the Sun angle is shallower than the diffuse-stow positions designated for mornings and afternoons.

Another factor analyzed may include whether the irradiance gain at the normal tracking position meets or exceeds a gain threshold. For example, the estimated POA irradiance at the diffuse-stow position may be required to be smaller than a pre-determined threshold for a pre-determined period to justify the deactivation of the diffuse-stow position. For example, the estimated POA irradiance gain, which is the estimated POA irradiance at the diffuse-stow angle minus the estimated POA irradiance at the normal tracking angle, may be required to be less than −2 W/m$^2$ for 2 minutes continuously to deactivate the diffuse-stow position. In these and other embodiments, the threshold values may be specified to decrease the frequency with which the PV module implements or deactivates the diffuse-stow position based on tracker wear considerations, a solar site operator's risk aversion to false positives, or any other reasons.

In blocks 226 and 228, the computer system may perform operations to deactivate the diffuse-stow position, if any of the results of the factors analyzed in block 218 indicate that the deactivation of the diffuse-stow position is recommended. In some embodiments, the diffuse-stow position may be deactivated when all of the factors analyzed in the block 218 recommends the deactivation of the diffuse-stow position. In other embodiments, the diffuse-stow position may be deactivated when one or more of the factors analyzed in block 218 recommends the deactivation of the diffuse-stow position.

In block 230, there may be a waiting period before the next iteration of the method 200 begins. Various steps of the method 200, including but not limited to the solar position calculation and the POA irradiance estimation, may be computationally demanding for low-power computer systems. Irradiance decomposition and transposition methods may have been developed to work on time-average data with intervals larger than a fixed interval, for example, 5 minutes, in which case running the method 200 more frequently than that interval may lead to erroneous irradiance decomposition and transposition calculations. In these and other embodiments, a waiting period may be implemented to give the computer system enough idle time to perform other tasks, or to prevent errors in irradiance decomposition and transposition calculations, or for any other reasons.

The method 200 may incorporate several numerical parameters such as irradiance thresholds and time periods that may be optimized prior to or during implementation of one or more steps associated with the method 200 based on historical GHI data. The GHI data may be obtained from sensor measurements at the location of the PV modules and/or satellite sources for the location of the PV modules, and the GHI data may be selected to encompass shorter- or longer-term variations in irradiance, such as being based on days, weeks, months, or years of historical time-series data points. Parameters which may be optimized include numerical inputs to one or more steps described in relation to the method 200, such as the threshold for the irradiance difference between the modeled POA at the diffuse-stow position and the modeled POA at the normal tracking position and/or the time period that the trackers are locked out of activating diffuse-stow after deactivating diffuse-stow.

In some embodiments, determining parameters associated with diffuse-stow positions may involve computer simulations of the method 200, which may vary any combination of parameters and track various details of the method 200 through time, such as normal tracking positions, activation and deactivation of diffuse-stow positions, modeled POA irradiances, any other details that may be relevant to comparing operation of the method with different parameters, or some combination thereof. The performance of steps associated with the method 200 involving different parameters may also be evaluated according to various metrics, such as the total irradiance gain over a time period, the total angular distance traveled by the trackers, some combination thereof, or any other metrics relating to the performance of simulation results.

Determining the parameters associated with diffuse-stow positions of the PV modules may involve tens, hundreds, thousands, or millions of simulations, which may be ranked or sorted according to the performance metrics. Simulations may also sample the parameter space uniformly or randomly and may identify better performing parameter values through an iterative process. For example, simulations may be based on one year of historical GHI data obtained from a satellite weather source for the location of the PV modules, and the results may indicate that increasing an irradiance threshold above a baseline or default value can increase the total irradiance gain.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

Figure 3A:
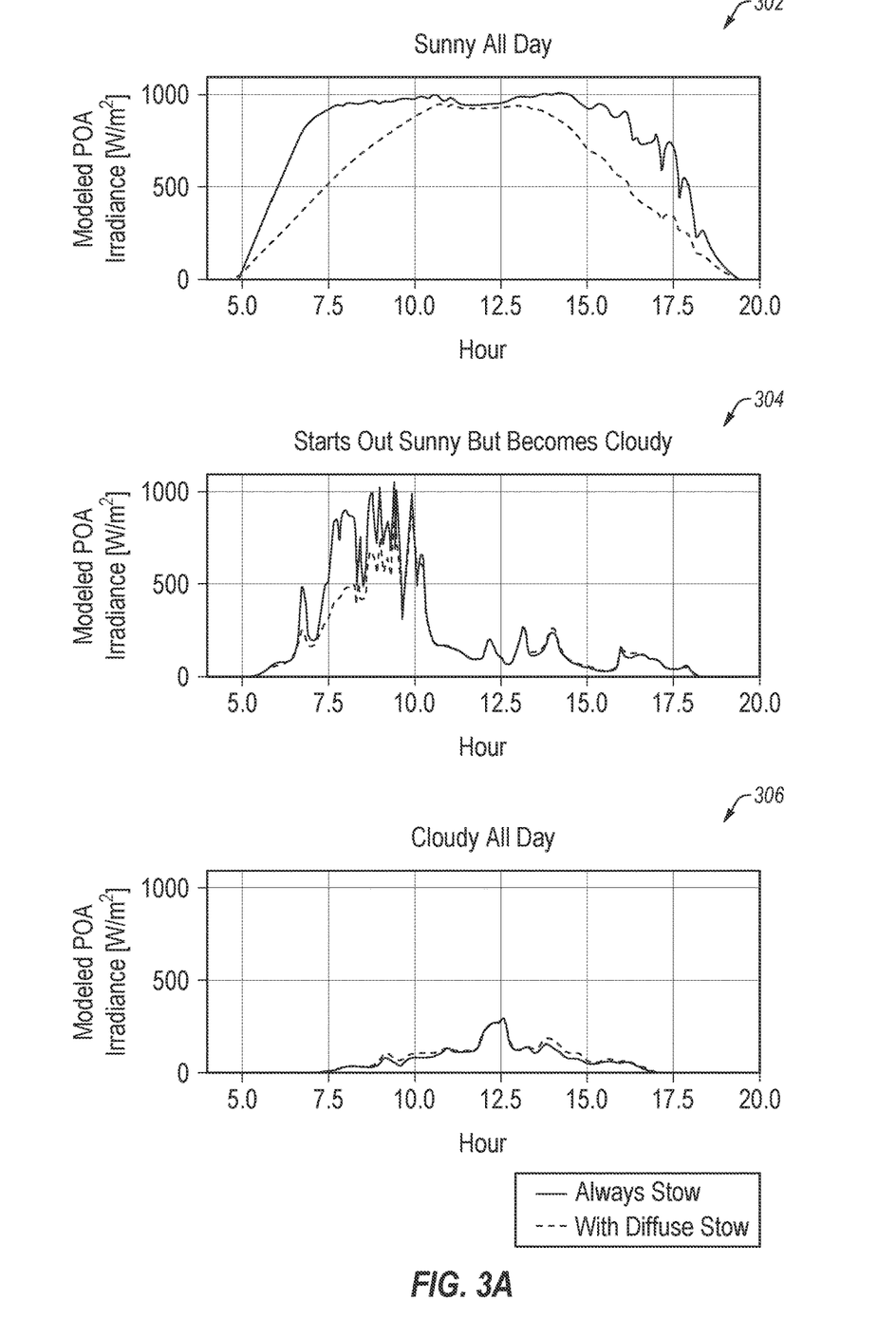
FIG. 3A depicts graphs illustrating modeled plane-of-array irradiance under different degrees of diffuse lighting environments.

FIG. 3A depicts graphs 302, 304, and 306 illustrating POA irradiance estimated by decomposition and transposition of measured GHI data under different degrees of diffuse lighting environments. A first graph 302 illustrates the modeled POA irradiance when a solar site is sunny during the entire day. A second graph 304 illustrates the modeled POA irradiance when the day starts out sunny and becomes cloudy. A third graph 306 illustrates the modeled POA irradiance when the solar site is cloudy during the entire day.

As illustrated by the graphs 302, 304, and 306, orienting PV modules included in the solar site at normal tracking positions yields greater POA irradiance than orienting the PV modules at diffuse-stow positions when the solar site is sunny. However, orienting the PV modules at the diffuse-stow positions when the solar site is cloudy typically provides the same or greater POA irradiances than orienting the PV modules at the normal tracking positions.

Figure 3B:
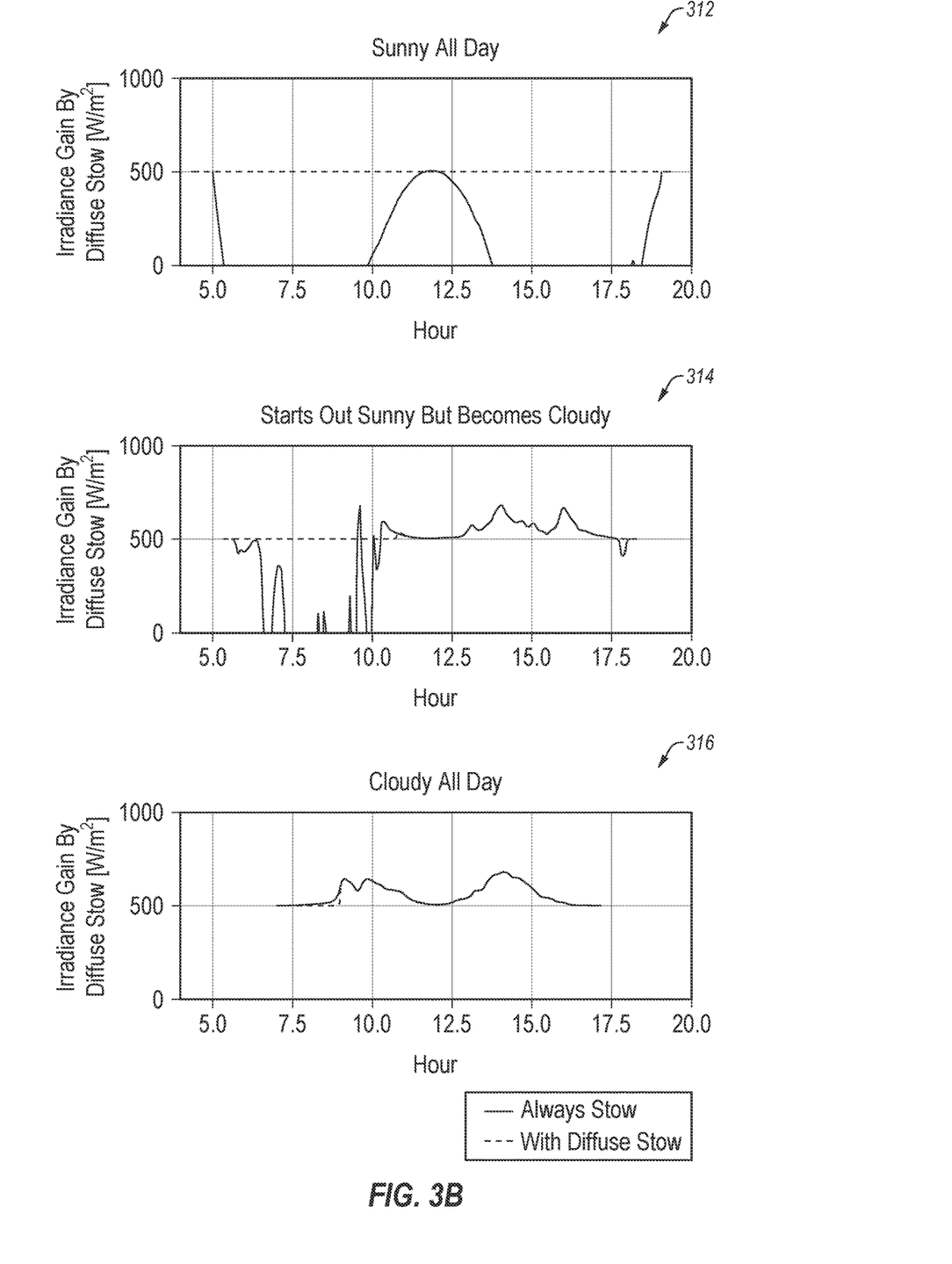
FIG. 3B depicts graphs illustrating irradiance gains under different degrees of diffuse lighting environments.

FIG. 3B depicts graphs 312, 314, and 316 illustrating irradiance gains under different degrees of diffuse lighting environments. A first graph 312, a second graph 314, and a third graph 316 illustrate comparisons of irradiance gains between always stowing a PV module included in a solar site and stowing the PV module according to a diffuse-stow method, such as the method 200 as described in relation to FIGS. 2A-2C when the solar site is sunny all day, starts out sunny but becomes cloudy, and cloudy all day, respectively. As illustrated by the graphs 312, 314, and 316, stowing the PV module based on the presence of diffuse lighting conditions according to the diffuse-stow method typically results in greater irradiance gains than always stowing the PV module.

Figure 3C:
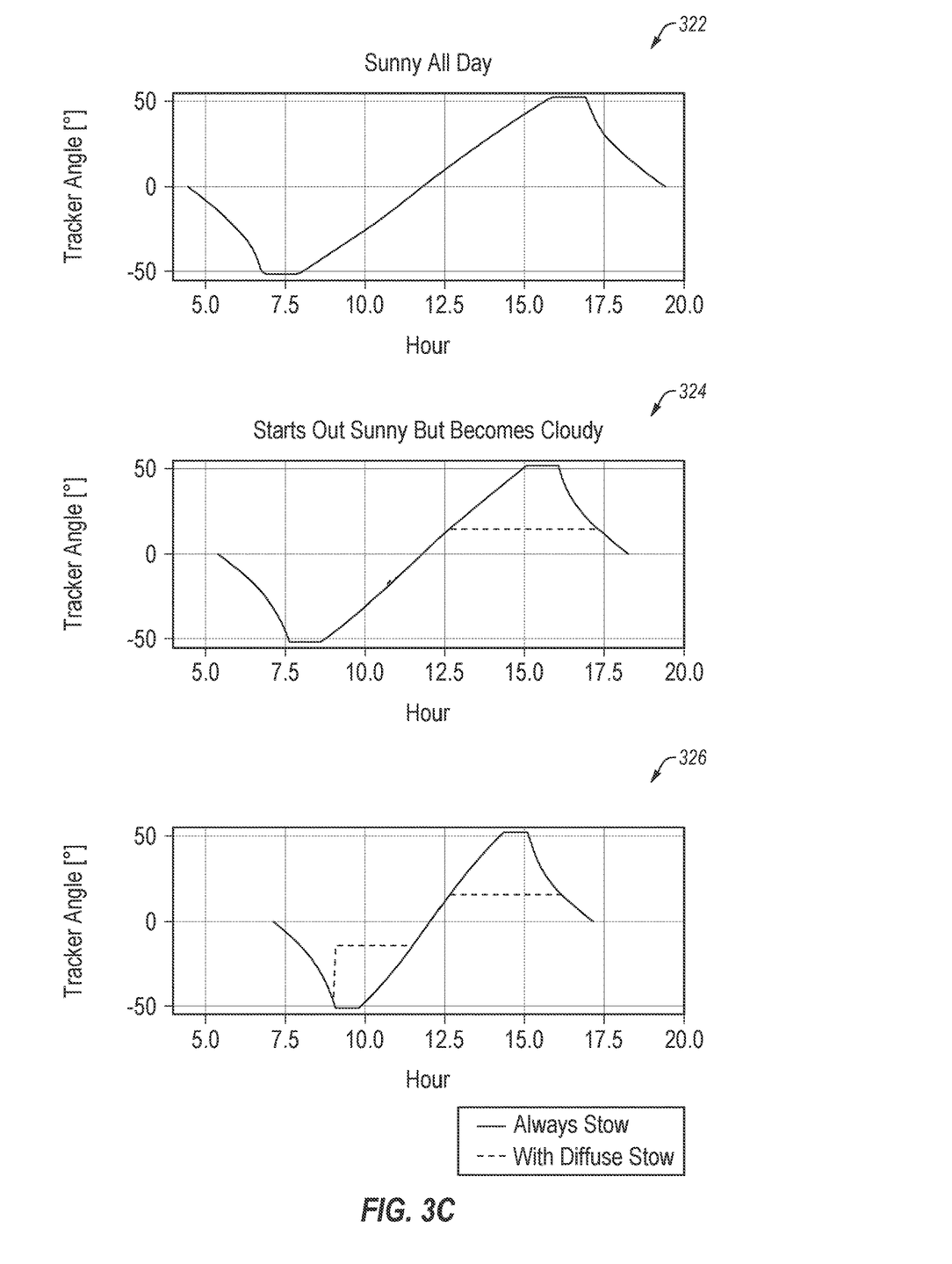
FIG. 3C depicts graphs illustrating tracking angles of a PV module under different degrees of diffuse lighting environments.

FIG. 3C depicts graphs 322, 324, and 326 illustrating tracking angles of a PV module under different degrees of diffuse lighting environments. A first graph 322 depicts tracking behavior of the PV module when the solar site is sunny all day; because the solar site is sunny all day, diffuse lighting conditions do not appear, and the tracking behavior of the PV module orients the PV module at the same tracking angles regardless of whether the PV module is following normal tracking positions or diffuse-stow positions. A second graph 324 depicts tracking behavior of the PV module when the solar site starts out sunny but becomes cloudy later in the day. During later hours of the day corresponding to when the solar site becomes cloudy (e.g., at approximately hour 12.5 as illustrated in the second graph 324), the tracking angle of the PV module may be shallower at the diffuse-stow positions than at the normal tracking positions. A third graph 326 depicts tracking behavior of the PV module when the solar site is cloudy during the entire day. The PV module may be oriented to shallower tracking angles during many points during the day, such as between approximately hours 9 and 11 and between approximately hours 12.5 and 16, at the diffuse-stow positions than at the normal tracking positions.

Figure 3D:
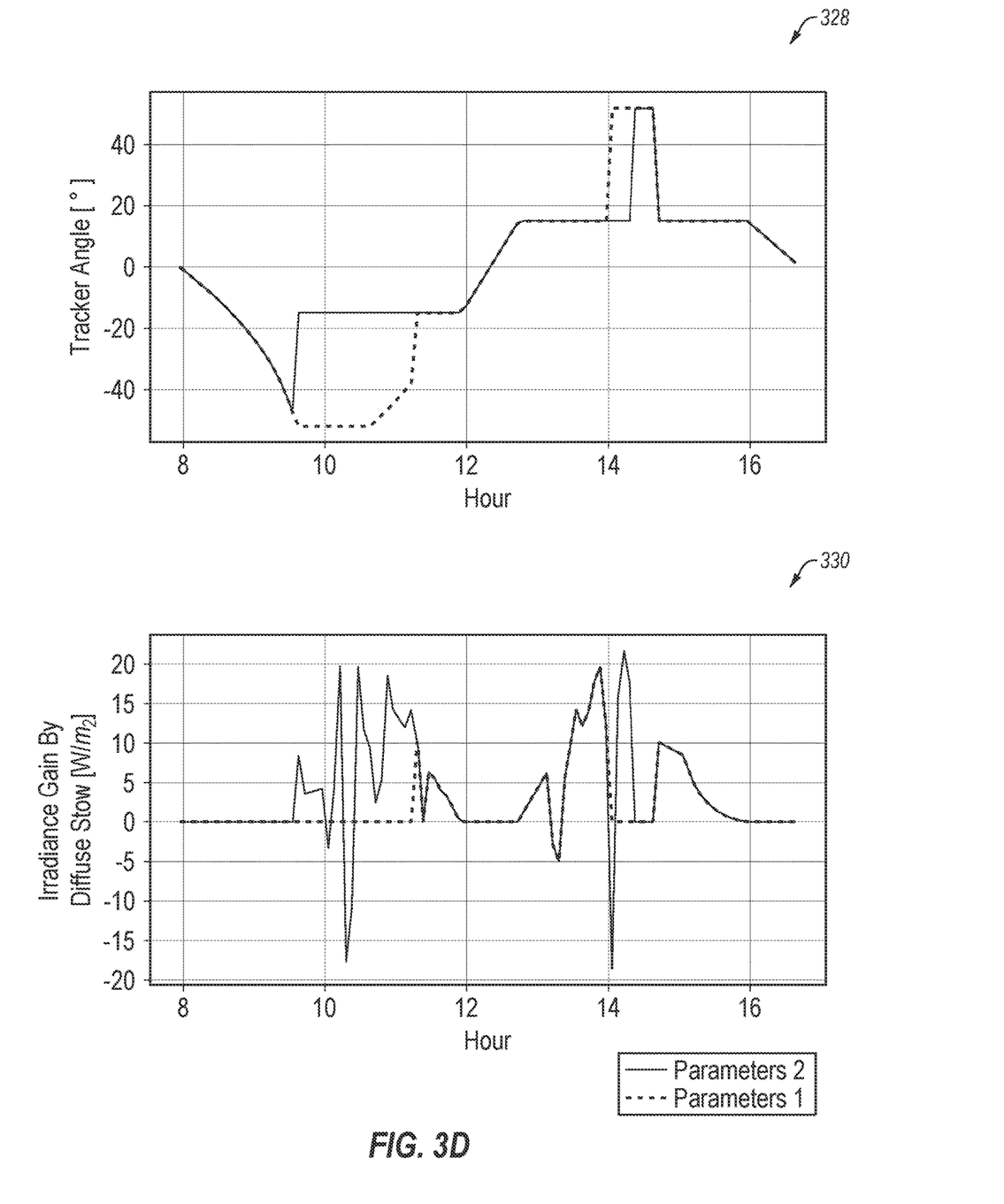
FIG. 3D depicts graphs illustrating a comparison between the tracker angles and irradiance gains of an example system with two different sets of diffuse-stow parameters.

FIG. 3D depicts graphs illustrating a comparison between the tracker angles and irradiance gains of PV modules using two different sets of diffuse-stow parameters. A first graph 328 depicts tracking angles corresponding to when the PV modules use a first set of diffuse-stow parameters ("Parameters 1") and when the PV modules use a second set of diffuse-stow parameters ("Parameters 2"). A second graph 330 shows the irradiances gains when using Parameters 1 and Parameters 2 corresponding to the tracking angles in graph 328. As illustrated in the first graph 328, when the PV modules are using Parameters 2, they spent more time in a diffuse-stow position such as between approximately hours 9.5 and 11 and between approximately hours 14 and 15. Correspondingly, the PV modules experienced greater daily irradiance gains when using Parameters 2 the PV modules using Parameters 1 as illustrated in the second graph 330.

FIG. 4 illustrates an example computing system 400, according to at least one embodiment described in the present disclosure. The computing system 400 may include a processor 410, a memory 420, a data storage 430, and/or a communication unit 440, which all may be communicatively coupled. Any or all of the computer system 130 of FIG. 1 may be implemented as a computing system consistent with the computing system 400.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to cause the computing system 400 to perform the operations of the method 200 of FIGS. 2A-2C. For example, in response to execution of the instructions by the processor 410, the system 400 may obtain GHI data corresponding to a solar site over a period of time, estimate a current POA irradiance at a normal tracking angle, estimate a current POA irradiance at a diffuse-stow tracking angle, calculate a POA irradiance gain, determine a last-available state of a PV module, determine whether the PV module is in a diffuse-stow position, determine whether the PV module is permitted to implement or deactivate the diffuse-stow position, determine whether the PV module captures greater irradiance in the diffuse-stow position, activate the diffuse-stow position, or deactivate the diffuse-stow position.

The memory 420 and the data storage 430 may include computer-readable storage media or one or more computer-readable storage mediums for having computer-executable instructions or data structures stored thereon. Such computer-readable storage media may be any available media that may be accessed by a general-purpose or special-purpose computer, such as the processor 410. For example, the memory 420 and/or the data storage 430 may store the GHI data, the current POA irradiances, the POA irradiance gain, the last-available state of the PV module, the solar angles at particular times during the day, or a time since the PV module last implemented the diffuse-stow position. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

What is claimed is:

1. A method for stowing photovoltaic (PV) modules during diffuse light conditions, the method comprising:
   determining, based on data collected by a sensor, a global horizontal irradiance (GHI) for a location of a solar tracking system at a specified time;
   determining, by a computer and based on the GHI, a first plane-of-array (POA) irradiance for a PV module in the solar tracking system at a normal tracking position at the specified time, wherein the first POA irradiance is estimated by decomposing the GHI into direct and diffuse components and transposing the direct and diffuse components for a first plane parallel to the PV module at the normal tracking position; and
   determining, by the computer and based on the GHI, a second POA irradiance for the PV module in the solar tracking system at a diffuse-stow position at the specified time, wherein the second POA irradiance is estimated by transposing the direct and diffuse components for a second plane parallel to the PV module at the diffuse-stow position;

comparing, by the computer, the first POA irradiance with the second POA irradiance to identify an irradiance gain at the diffuse-stow position; and placing the PV module into the diffuse-stow position based upon a determination that the irradiance gain exceeds a gain threshold.

2. The method of claim 1, wherein the GHI is determined based on data gathered from a sensor at the location of the solar tracking system.

3. The method of claim 2, wherein the sensor used is a pyranometer installed in a horizontal position.

4. The method of claim 1, wherein the irradiance gain is identified by subtracting the first POA irradiance from the second POA irradiance.

5. The method of claim 1, wherein the threshold gain is not less than 5 watts per meter squared.

6. The method of claim 1, wherein the diffuse-stow position is not stationary but tracks within a diffuse-stow range that is less than approximately 20 degrees on either side of horizontal (0 degrees) and includes a horizontal position.

7. The method of claim 6, wherein the diffuse-stow position and the normal tracking position are the same during times at which the normal tracking position falls within the diffuse-stow range.

8. The method of claim 1, wherein placing the PV module into the diffuse-stow position is based on a determination that the irradiance gain exceeds the gain threshold consistently for a period of time.

9. The method of claim 8, wherein the period of time is less than 1 hour.

10. The method of claim 1, further comprising:
identifying an amount of time elapsed since the PV module last exited the diffuse-stow position prior to the specified time,
wherein the placing of the PV module into the diffuse-stow position is also based on a determination that the amount of time elapsed since the PV module last exited the diffuse-stow position prior to the specified time exceeds a threshold length of time.

11. The method of claim 10, wherein the threshold length of time is less than 1 hour.

12. The method of claim 1, further comprising:
identifying a number of times that the PV module has entered the diffuse-stow position during a current period from sunrise to sunset prior to the specified time,
wherein the placing of the PV module into the diffuse-stow position is also based on a determination that the number of times that the PV module has entered the diffuse-stow position during the current period from sunrise to sunset prior to the specified time does not exceed an occurrence threshold.

13. The method of claim 12, wherein the occurrence threshold is more than 2 times during the current period from sunrise to sunset.

14. The method of claim 1, further comprising:
determining a proximity of the normal tracking position to another tracking event,
wherein the placing of the PV module into the diffuse-stow position is also based on a determination that the normal tracking position is not within a proximity threshold to another tracking event.

15. The method of claim 14, wherein the tracking event is a maximum angle of the PV module and the proximity threshold is less than 1 hour from the beginning or the end of the tracking event.

16. The method of claim 1, further comprising:
determining whether the normal tracking and the diffuse-stow positions are the same, wherein the placing of the PV module into the diffuse-stow position is also based on a determination that the normal tracking and the diffuse-stow positions are different.

17. The method of claim 1, further comprising:
determining a difference between a maximum GHI and a minimum GHI over a period of time prior to the specified time,
wherein the placing of the PV module into the diffuse-stow position is also based on a determination that the difference between a maximum GHI and a minimum GHI does not exceed a variability threshold.

18. The method of claim 17, wherein the variability threshold is less than 500 Watts per meter squared and the period of time is less than 1 hour.

19. A method for stowing photovoltaic (PV) modules during diffuse light conditions, the method comprising:
determining, based on data collected by a sensor, a global horizontal irradiance (GHI) for a location of a solar tracking system at a specified time;
determining, by a computer and based on the GHI, a first plane-of-array (POA) irradiance for a PV module in the solar tracking system at a normal tracking position at the specified time; and
determining, by the computer and based on the GHI, a second POA irradiance for the PV module in the solar tracking system at a diffuse-stow position at the specified time;
comparing, by the computer, the first POA irradiance with the second POA irradiance to identify an irradiance gain at the diffuse-stow position;
determining a difference between a maximum GHI and a minimum GHI over a period of time prior to the specified time; and
placing the PV module into the diffuse-stow position based upon a determination that the irradiance gain exceeds a gain threshold, wherein the placing of the PV module into the diffuse-stow position is also based on a determination that the difference between a maximum GHI and a minimum GHI does not exceed a variability threshold.

20. A method for stowing photovoltaic (PV) modules during diffuse light conditions, the method comprising:
determining, based on data collected by a sensor, a global horizontal irradiance (GHI) for a location of a solar tracking system at a specified time;
determining, by a computer and based on the GHI, a first plane-of-array (POA) irradiance for a PV module in the solar tracking system at a normal tracking position at the specified time wherein the first POA irradiance is estimated by decomposing the GHI into direct and diffuse components and transposing the direct and diffuse components for a first plane parallel to the PV module at the normal tracking position; and
determining, by the computer and based on the GHI, a second POA irradiance for the PV module in the solar tracking system at a diffuse-stow position at the specified time, wherein the second POA irradiance is estimated to be the same as the GHI;
comparing, by the computer, the first POA irradiance with the second POA irradiance to identify an irradiance gain at the diffuse-stow position; and
placing the PV module into the diffuse-stow position based upon a determination that the irradiance gain exceeds a gain threshold.

* * * * *